United States Patent
Wilkerson

(10) Patent No.: US 10,914,297 B2
(45) Date of Patent: Feb. 9, 2021

(54) MOBILE-AUTOMATIC POWER SUPPLY FOR SUMP PUMP

(71) Applicant: Timothy J. Wilkerson, Braidwood, IL (US)

(72) Inventor: Timothy J. Wilkerson, Braidwood, IL (US)

(*) Notice: Subject to any disclaimer, the term of this patent is extended or adjusted under 35 U.S.C. 154(b) by 84 days.

(21) Appl. No.: 16/194,275

(22) Filed: Nov. 16, 2018

(65) Prior Publication Data

US 2019/0154021 A1    May 23, 2019

Related U.S. Application Data

(60) Provisional application No. 62/587,637, filed on Nov. 17, 2017.

(51) Int. Cl.

| | |
|---|---|
| *F04B 17/06* | (2006.01) |
| *H02J 9/06* | (2006.01) |
| *F04B 47/06* | (2006.01) |
| *F04B 17/03* | (2006.01) |
| *F04B 53/16* | (2006.01) |
| *F04B 49/02* | (2006.01) |
| *F04B 49/025* | (2006.01) |

(52) U.S. Cl.
CPC .............. *F04B 17/06* (2013.01); *F04B 17/03* (2013.01); *F04B 47/06* (2013.01); *F04B 49/02* (2013.01); *F04B 49/025* (2013.01); *F04B 53/16* (2013.01); *H02J 9/062* (2013.01); *H02J 9/068* (2020.01)

(58) Field of Classification Search
CPC .......... F04B 17/06; F04B 17/03; F04B 47/08; F04B 49/025; F04B 53/16; F04B 47/06; F04B 49/02; H02J 9/062; H02J 9/068
See application file for complete search history.

(56) References Cited

U.S. PATENT DOCUMENTS

| | | | | |
|---|---|---|---|---|
| 6,146,108 | A * | 11/2000 | Mullendore | ............ F04B 23/00 417/234 |
| 7,316,049 | B1 * | 1/2008 | Robinson, Sr. | ............ A47L 5/36 15/327.2 |
| 2005/0281679 | A1 * | 12/2005 | Niedermeyer | ........ F04D 15/029 417/36 |
| 2006/0269426 | A1 * | 11/2006 | Llewellyn | ............... B63B 13/00 417/411 |
| 2008/0031752 | A1 * | 2/2008 | Littwin | ............... F04D 15/0218 417/411 |

(Continued)

*Primary Examiner* — Christopher R Harmon
(74) *Attorney, Agent, or Firm* — Donald G. Flaynik, Jr.

(57) ABSTRACT

A mobile power supply device and method for energizing a sump pump in a sump pit during a power outage, and a mobile power supply device and method for energizing a sump pump secured to a bottom portion of the device. The device includes an enclosure similar to a dolly that is manufactured from plastic or similar non-electrically conductive material to minimize weight to enable the manual lifting and pulling of the mobile power supply device, and to promote safety by reducing the chance of an electrical short circuit when supplying electrical power to a sump pump. The enclosure includes a carrying handle and a relatively large dolly handle that cooperate with castors attached to a bottom portion or bottom surface of the enclosure. The castors promote manual movement of the device upon a substantially horizontal surface or up and/or down stairs leading to a sump pump in a sump pump well or pit in a basement.

15 Claims, 5 Drawing Sheets

(56) References Cited

U.S. PATENT DOCUMENTS

| | | | |
|---|---|---|---|
| 2009/0269217 A1* | 10/2009 | Vijayakumar | F04B 17/06 417/234 |
| 2010/0303654 A1* | 12/2010 | Petersen | F04B 35/06 417/423.7 |
| 2014/0119946 A1* | 5/2014 | Boese | F04D 15/0066 417/2 |
| 2015/0143900 A1* | 5/2015 | Cummings | G01F 23/74 73/308 |
| 2015/0147190 A1* | 5/2015 | Cummings | F04D 15/0088 417/36 |

* cited by examiner

MOBILE-AUTOMATIC POWER SUPPLY FOR SUMP PUMP

This Utility Patent Applications is based on Provisional Patent Application No. 62/587,637 filed on Nov. 17, 2017.

BACKGROUND OF THE INVENTION

1. Field of the Invention

The present invention relates to back-up power supplies for sump pumps, and more particularly, to a manually portable or mobile power supply that can be disposed to automatically energize an existing sump pump motor to remove water from an existing sump well. The present invention includes a sump pump in the mobile power supply enclosure that enables the mobile power supply to remove water from a flooded area by manually position the mobile power supply in the flood water and closing a switch that energize the sump pump in the enclosure.

2. Background of the Prior Art

A myriad of prior art back-up power supply designs for sump pumps are commercially available. Prior art power supplies are installed adjacent to the sump pump for automatic starting of the sump pump in the event that the main power source is interrupted and a high water level is detected in the sump well, but these power supplies are not mobile. Other back-up power supply designs are mobile and can be manually disposed at flooded areas, but these mobile power supplies do no automatically energize an existing sump pump motor when the main power source to that sump pump motor is interrupted.

In addition, prior art back-up power supplies do not include a sump pump in the enclosure containing the batteries to enable the enclosure to be manually disposed in flood waters, then energizing the sump pump in the enclosure by manually moving a switch to an "on" position to remove flood water.

There is a need for a sump pump back-up power supply that provides automatic starting for a sump pump when a main power supply is interrupted and a high water level is detected in a sump pit. There is further need for a back-up power supply that includes an enclosure containing a sump pump, which can be disposed in a water of a flooded area, the back-up power supply being manually operated by closing a switch that energizes the enclosure sump pump, resulting in the removal of water from the flooded area to a predetermined remote area.

SUMMARY OF THE INVENTION

It is an object of the present invention to overcome many of the disadvantages associated with prior art back-up power supply devices for a sump pump. A principal object of the present invention is to provide a back-up power supply for sump pumps that is capable of automatically starting a sump pump when a main power source is interrupted and a high water level exists. Another object of the present invention is to include a back-up power supply with automatic starting capability and a manually movable enclosure containing a sump pump and a battery power source; the manually movable enclosure ultimately being disposed in water in a flooded area, thereby enabling the sump pump in the mobile enclosure to be energized by the battery power source and remove the surrounding flood water to another location. A feature of the power supply is handles and castors secured to an enclosure containing electrical components and a sump pump. Another feature of the power supply is an enclosure having upper and lower portions with electrical components in the upper portion and a sump pump in the lower portion. An advantage of the power supply is that the enclosure is mobile. Another advantage of the power supply is that electrical components are isolated from flood water in the upper portion of the enclosure and the sump pump disposed in a lower portion of the enclosure disposed in flood water, thereby promoting the removal of flood water via the sump pump in the enclosure.

Another object of the present invention is to provide electrical equipment for automatically starting and stopping a sump pump in a sump well after a main power source for the sump pump is interrupted. A feature of the power supply is a level sensor disposed in a sump pit and a level controller disposed in the enclosure, the level sensor communicating with the level controller to start a sump pump when main power is interrupted and high water level is present in the sump well. An advantage of the power supply is that the level controller energizes the sump pump motor when the water level in the sump well reaches a predetermined high level.

Yet another object of the present invention is to provide a back-up power supply capable of notifying a person about a high water condition present in a sump well. A feature of the power supply is a level controller having a wireless system that can transmit a high level alarm to a smart phone. An advantage of the power supply is that the person informed of the high level condition via the smart phone can energize the sump pump in the power supply enclosure to add pumping capacity to remove water accumulating in a basement due to water overflowing the sump well.

In brief, the present invention is a mobile-automatic power supply device for a sump pump that includes:

an enclosure having a handle that cooperates with wheels attached to the enclosure to promote manual movement of the device, the enclosure having slidably connected upper and lower portions that enable an upper portion of the enclosure to be elevated above a water level and detachably secured to the lower portion, thereby isolating electrical components in the upper portion from water covering a flooded area;

a battery sized to operate a sump pump in a sump pump well for a predetermined time period after a power outage;

an electrical receptacle for receiving a power cord connected to the sump pump;

an electrical inverter for converting 12 V.D.C. to 120 V.A.C. for energizing the sump pump;

a level sensor disposed in the sump pump well, the level sensor cooperating with a level controller disposed in the enclosure to cause the sump pump to energize when a predetermined high water level in the sump well is detected, the level sensor and controller cooperating to cause the sump pump to de-energize when a predetermined low water level in the sump well is detected; and a second sump pump disposed in the lower portion of the enclosure such that a water intake port of the second sump pump is below the surface of the water covering the flooded area, thereby enabling said second sump pump to transport water from a flooded area to a predetermined area sufficiently remote to prevent transported water from seeping back into the flooded area; whereby, the device is manually disposed to operate a sump pump remote to the device such that the sump pump removes water from a sump well, and/or the device is manually disposed in water flooding an area such that a sump pump included in the device removes water from the flooded area and transports the removed water to a predetermined remote area.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Figure 1:
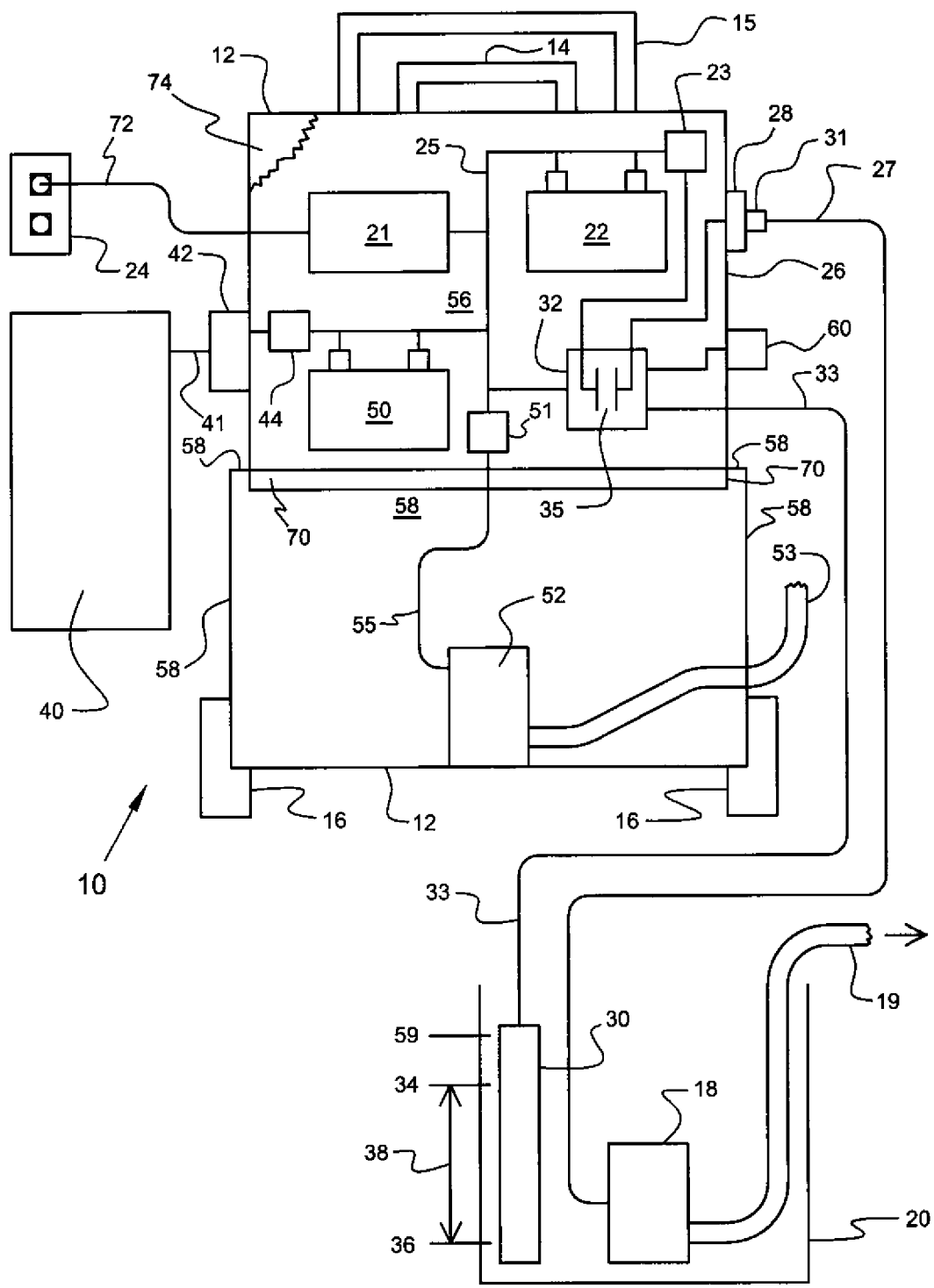
FIG. 1 is a plan diagram of a mobile-automatic power supply for a sump pump in accordance with the present invention.
Figure 2:
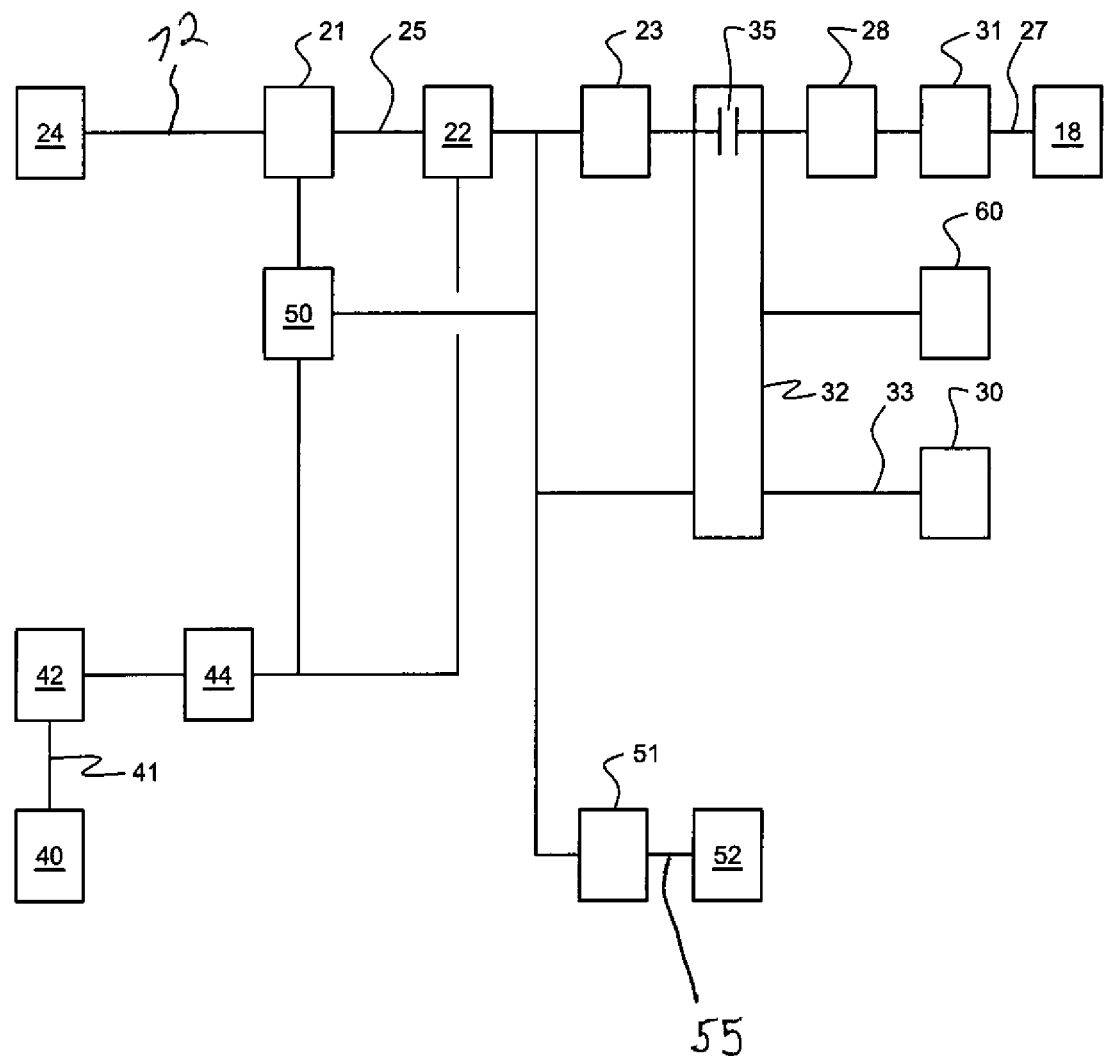
FIG. 2 is an electrical block diagram illustrating the electrical connections for the electrical components for the mobile-automatic power supply for a sump pump depicted in FIG. 1.
Figure 3:
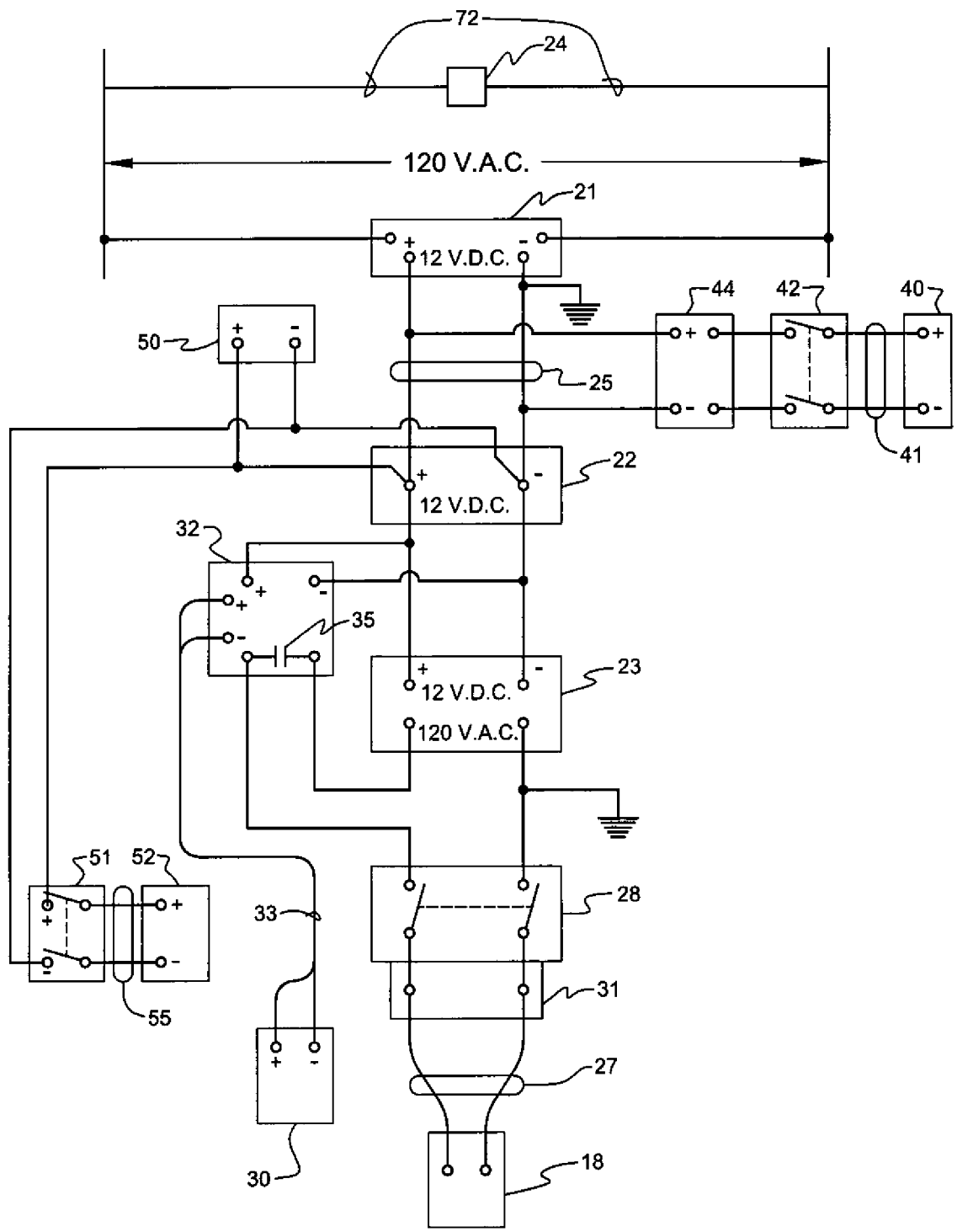
FIG. 3 is an electrical wiring diagram for the mobile-automatic power supply of FIGS. 1 and 2.
Figure 4:
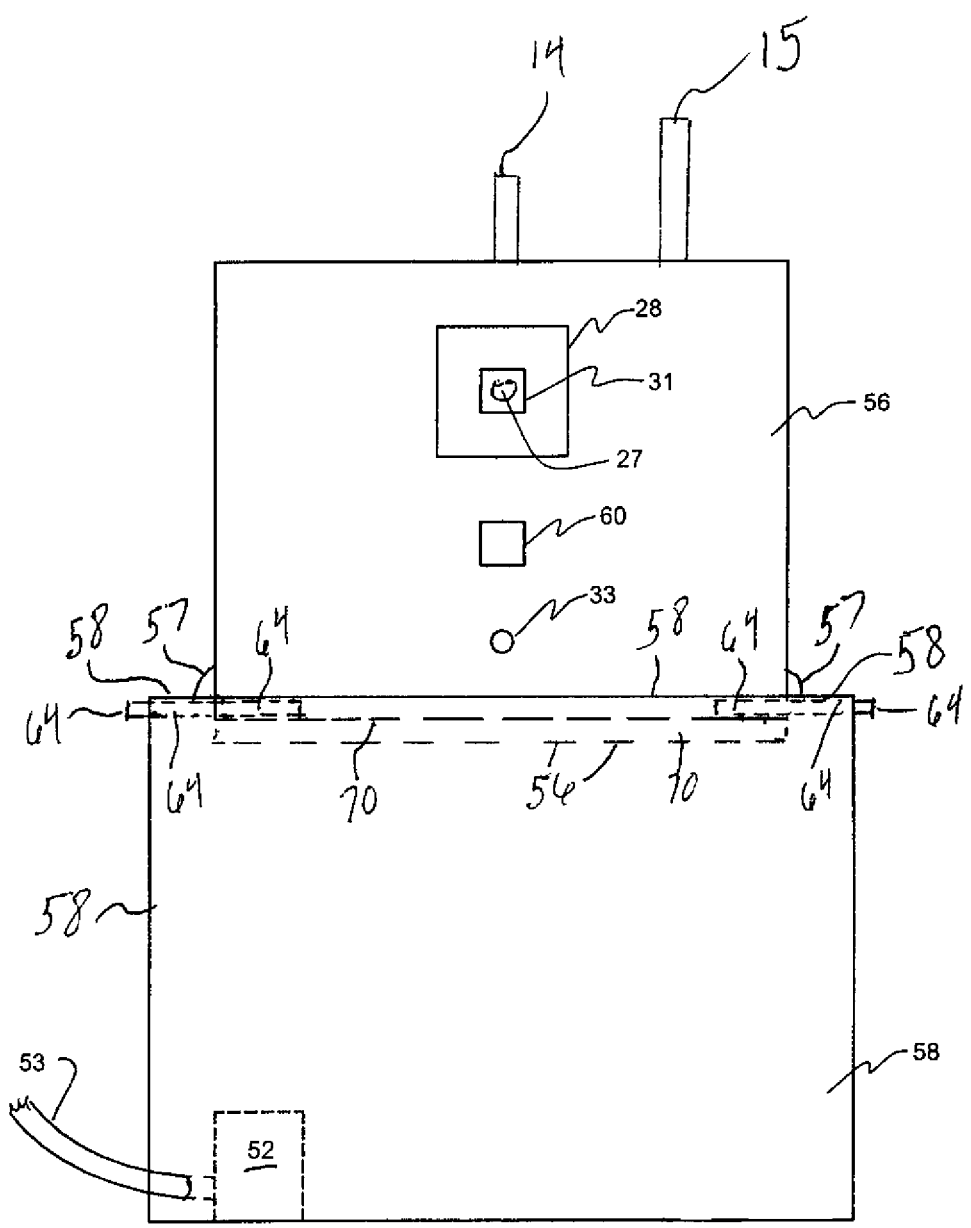
FIG. 4 is a right side elevation view of the enclosure depicted in FIG. 1, but without castors attached.
Figure 5:
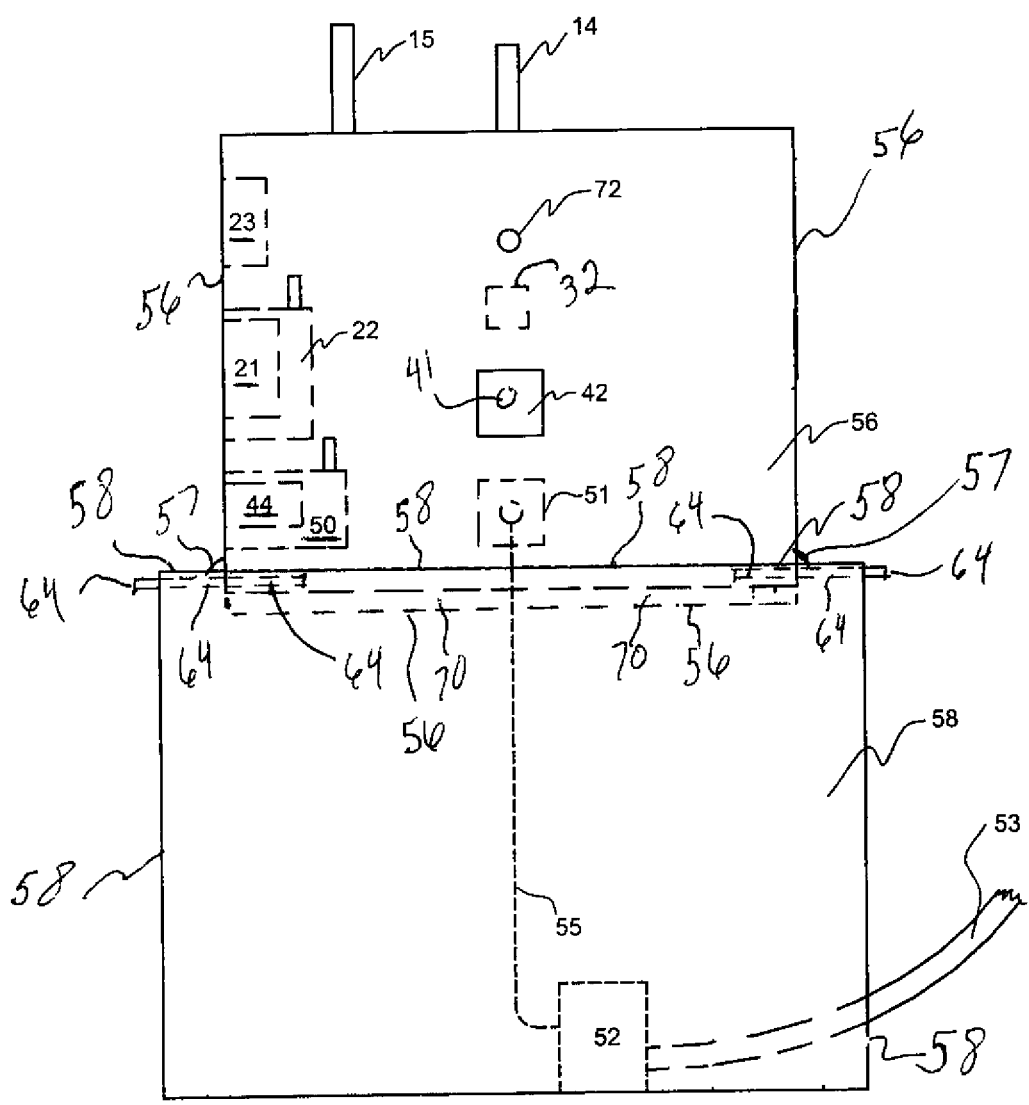
FIG. 5 is a left side elevation view of the enclosure depicted in FIG. 1, but without castors attached.

Referring now to the drawings, a mobile-automatic start and stop power supply device and method for energizing a sump pump during a power outage is denoted as numeral 10. The device 10 includes an enclosure 12 that functions as a standalone housing or "dolly" for manual mobility and is manufactured from plastic, wood or similar non-electrically conductive material to minimize weight to enable the manual lifting and pulling of the mobile power supply device 10, and to promote safety by reducing the chance of an electrical short circuit when supplying electrical power to a sump pump 18. The enclosure 12 includes a carrying handle 14 and a relatively large dolly handle 15 (horizontally and vertically offset from the carrying handle 14) that cooperate with wheels or castors 16 attached to a bottom portion or bottom surface of the enclosure 12 for promoting manual movement of the device upon a substantially horizontal surface or up and/or down stairs leading to and from a preexisting sump pump 18 disposed in a sump pump well or pit 20 in the basement of a home or similar structure below ground level. The enclosure 12 can be rectangular configured by six walls with a hinged front wall 74 to expose the internal components of the enclosure to ultimately replace failed electrical components and discharged or added batteries. An alternative configuration is to include a hinged front wall 74 that covers only an upper portion 56 of the enclosure 12, thereby exposing a lower portion 58 that includes a 12 V.D.C. sump pump 52 for easy access for the user of the device 10 (see FIG. 1). A dividing member or plate 70 fabricated from non-electrically conductive material may be detachably joined at the option of the user to the bottom of the upper portion 56 and the top of the lower portion 58 to electrically and mechanically separate the upper and lower portions 56 and 58.

A preferred configuration for the enclosure 12 is to include separated upper and lower portions 56 and 58 dimensioned such that the upper portion 56 is slightly smaller than the lower portion 58 to promote the snug insertion of the upper portion 56 into the lower portion 58, thereby enabling the upper portion 56 to be elevated relative to the lower portion 58 when the device 10 is used to remove water from a selected area via the sump pump 52 in the lower portion 58. The dividing member 70 forms a substantial water barrier for preventing water from engaging the electrical components in the upper portion 56 when the sump pump 52 in the lower portion 58 is energized and removes water via a flexible discharge conduit or pipe 53.

The typical existing sump pump 18 includes a power cord 27 having a standard 3 prong plug (hot, neutral and ground) attached to one end of the power cord 27 with the opposite end of the power cord 27 mechanically secured to and electrically connected to an electrical motor detachably secured to the sump pump 18. The pump 18 further includes a high water level switch (not depicted) that ultimately energizes the motor which rotates the pump 18 when a high level occurs 34 in the well 20. The pump 18, power cord 27 and high water level switch assembly enables a user to remove water from the well 20 by depositing the pump 18 in the well 20 and inserting the plug into a standard 120 V.A.C. electrical receptacle 24 adjacent to the pump 18; whereupon, a predetermined high water level 34 causes electrical contacts in the high water level switch to close, thereby energizing the motor and rotating the pump 18 to remove water from the well 20 until a predetermined low water level is sensed by the high water level switch.

The present device 10 is manually mobile and enables a user to dispose the device 10 adjacent to the preexisting pump 18 in the well 20, such that the device 10 can energize the motor-pump 18 combination and remove water from the well 20 after power has been interrupted to the receptacle 24. The device 10 energizes the pump motor via a first 12 V.D.C. battery 22 connected to an inverter 23 that converts the 12 V.D.C. to 120 V.A.C., which is supplied to the motor detachably secured to the pump 18. Further, the inverter 23 together with all cooperating electrical equipment required to energize a sump pump 18 having a voltage rating other than 120 V.A.C., can include a voltage rating corresponding to the sump pump 18 voltage, irrespective of the sump pump 18 voltage being A.C. or D.C.

The battery 22 has an amp-hour rating sufficient to operate the sump pump 18 for a predetermined time span (twenty-four hours for example) after a power outage. The required amp-hour rating for a predetermined sump pump 18 is easily determined by one of ordinary skill in the art. The preferred battery 22 is lithium having relatively light weight and a relatively high amp-hour rating that supplies a nominal 12 V.D.C. power to the inverter 23 in the enclosure 12. Inverters 23 are well known to those of ordinary skill in the art and are readily sized to convert 12 V.D.C. power to the required 120 V.A.C. power required by the preexisting sump pump 18 or by a replacement sump pump 18 having greater water pumping capacity.

A battery charger 21 is disposed in the enclosure 12 and is connected to the battery 22 via wires 25. The battery charger 21 is ultimately plugged into a standard 120 V.A.C. home electrical receptacle 24 to supply power to the battery charger 21, which converts the 120 V.A.C. to 12 V.D.C. to maintain the battery 22 fully charged until the battery 22 is required to energize the sump pump 18 via the inverter 23. A double pole-single throw disconnect switch 28 is secured to the outer side wall 26 of the enclosure 12. The disconnect switch 28 isolates the battery 22 and voltage inverter 23 from the sump pump 18 to promote safety for a person inspecting and/or touching the sump pump 18 in the sump pump well 20.

A level sensor 30 is disposed in the sump pit 20 containing the sump pump 18 and the cooperating level controller 32 is disposed in the enclosure 12. The level controller 32 receives an electrical signal from the level sensor 30 that represents the water level in the well 20. The electrical signal is transmitted from the level sensor 30 to the controller 32 via a pair of wires in a flexible water proof cover 33, the same wires 33 supply power from the controller 32 (which receives power from the battery 22) to the sensor 30 at a relatively low voltage that prevents injury to anyone coming in contact with the wet surface of the sensor 30. The sensor 30 enables the controller 32 to continuously determine the water level in the sump pump well 20 at any point between a low water level 36 and a high water level alarm point 59, thereby enabling the controller 32 to control water level in the well 20 by closing contacts 35, resulting in the battery 22 energizing the sump pump 18. The sensor 30 also provides continuous well 20 water level information to the controller 32 that can be relayed to a computer (not depicted) via a Universal Serial Bit (UBS) port 60 connected to the controller 32. The controller 32 is linked to the computer via hard wire or wireless modems, thereby allowing a person concerned about a possible loss of power at the receptacle 24 to watch or listen via a smart phone or computer screen in real time water removal from the well 20 by the device 10.

The level controller 32 energizes the sump pump 18 motor by closing electrical contacts 35 inside and operated by the controller 32 when a predetermined high water level 34 in the sump well 20 is detected. The level sensor 30 and level controller 32 also cooperate to de-energize the sump pump 18 by opening the contacts 35 when a predetermined low water level 36 in the sump pump is detected. The level sensor 30 and controller 32 can be replaced by a myriad of level sensor and controlling devices including but not limited to electrical float switches, sonic sensors, sensing rods and combinations thereof; and electrical or digital controllers having a myriad of control parameters. The level sensors and controllers are all well known to those of ordinary skill in the art.

The mobility of the device 10 enables the device 10 to be manually disposed adjacent to the well 20 to remove water from the well 20 after power is lost at the power source receptacle 24. The combination of the above described electrical components enables the device 10 to automatically start when a high water level is measured in the well 20, thereby allowing the device 10 to be disposed adjacent to the well 20 before power is lost at the receptacle 24, and initiating device 10 water removal operation after power is lost at the receptacle 24. The device continuously removes water from the well 20 after the water level has reached the high level 34, and continues to remove water until a low water level 36 is reached, whereupon, the level controller 32 opens contacts 35 and de-energizes the motor coupled to the sump pump 18, thereby allowing water to again accumulate in the well 20.

The level sensor 30 is manually disposed in the sump well 20, and the plug of the sump pump flexible power cord 27 is manually inserted into an electrical receptacle in the disconnect switch 28, thereby enabling the device 10 to start and stop the sump pump 18 automatically, resulting in the maintaining of a predetermined water level range 38 in the sump well 18. The water level range 38 is defined by the high and low water setpoints 34 and 36 programmed into level controller 32, resulting in the sump pump 18 motor being energized when the level controller 32, via the level sensor 30, detects a high water level 34 in the pit 20. The energized sump pump 18 removes water from the sump pit 20 via a discharge pipe 19 until the level controller 32 detects a low water level 36 in the sump pit 20; whereupon, the level controller 32 de-energizes the sump pump 18 motor, thereby allowing the water level in the pit 20 to increase until again reaching the high level set point 34 causing the water removing cycle to repeat.

The device 10 further includes a solar panel 40 for charging the battery 22 (when a 120 V.A.C. electrical receptacle 24 is not available) via wires encased in a flexible weather proof cover 41. To safely promote the connection of the solar panel 40 to the battery 22; a double pole-single throw disconnect switch 42 for isolating the solar panel 40 from the battery 22, and a voltage regulator 44 for maintaining the charging current from the solar panel 40 to the battery 22 at a nominal 12 V.D.C. are included.

The mobile power supply device 10 can be modified to include a second 12 V.D.C. battery 50 or multiple 12 V.D.C. batteries (secured to the device 10 via a bracket (not depicted)) and electrically connected in parallel with the first batter 22 to provide additional operating time for the device 10 after a power outage occurs. Further, the mobile device 10 can be expanded to include a 12 V.D.C. sump pump 52 secured to a bottom portion of the device 10 such that the sump pump 52, when energized via the battery 22, can suction water into an intake port of the sump pump 52, when the intake port is below the surface of the water of a flooded basement (for example), then discharge the suctioned water via a flexible conduit 53 secured to a discharge port of the sump pump 52 such that the suctioned water is deposited remotely from the flooded area.

To enable the mobile device 10 to remove relatively deep water from a remote area where no sump pump is available, the enclosure 12 with all electrical components and batteries 22 and 50 are secured in an upper portion 56 of the enclosure 12 of the device 10, including a double pole-single throw disconnect switch 51 that manually connects the batteries 22 and 50 to the sump pump 52 via wires 55 extending through an aperture (not depicted) in the dividing member 70. The 12 V.D.C. sump pump 52 is secured in a lower portion 58 of the device 10, and the upper and lower portions 56 and 58 are slidably joined such that the upper portion 56 snugly inserts into the lower portion 58, thereby enabling the upper portion 56 to be manually elevated relative to the lower portion 58. A peripheral rubber gasket 57 prevents moisture from seeping between engaging vertical walls of the upper and lower portions 56 and 58 as the upper portion 56 is slidably positioned relative to the lower portion 58.

When the upper portion 56 has been manually elevated to a selected position, multiple extractable retaining rods 64 are inserted through one of a myriad of vertically aligned cooperating apertures (not depicted) in the walls of each of the lower and upper portions 58 and 56, thereby maintaining a selected elevated position for the upper portion 56 relative to the lower portion 58 when a selected aperture in the upper portion 56 is aligned with an aperture in the lower portion 58 and a retaining rod 64 is inserted through both apertures. Added support for the upper portion 56 can be provided by including telescoping legs similar in design to the shaft of an umbrella (not depicted) that are joined to a bottom inner wall of the lower portion 58 and a bottom wall of the dividing member 70. The elevated upper portion 56 prevents water from engaging electrical components in the upper portion 56 of the enclosure, and allows water to engage the sump pump 52 disposed in the lower portion 58, such that a suction port of the sump pump 52 is disposed below the water level at a position that promotes the removal of substantially all standing water via a flexible conduit 53 connected to a discharge port of the sump pump 52. A relatively long power cord 55 connects the load side of the disconnect switch 51 to the 12 V.D.C. pump 52, thereby allowing maximum manual elevation of the upper portion 56 relative to the lower portion 58.

The mobile power supply device 10 for sump pumps further includes a high water level alarm that is activated by the level controller 32 when the water level in the sump pit 20 reaches a preselected high level 59 above the high water level 34. In the event that the high sump pump 18 cannot prevent the water level in the well 20 from rising to the preselected high water alarm level 59 in the well 20, a high water level alarm will sound at a preselected location and will be transmitted to a smart phone of a person responsible for preventing water damage due to rising water level in the well 20 rising above the well 20 and into the surrounding area. The high water level alarm can include, but not be limited to an audio signal or visual signal, or by using a USB port 60 connected to the level controller 32, alarms can be routed to a preselected designee via phone lines or a WIFI system connected to the level controller 32 to provide an alarm to a designated smart phone. The alarm can be in achieved via a recorded phone call, text, email or similar communication means.

In operation, when using the device 10 as an automatic start-stop back-up for an existing sump pump 18, a flexible power cord 72 connected to the battery charger 21 is plugged into an electrical receptacle 24, and a power cord 27 connected to the existing sump pump 18 is plugged into an electrical receptacle 31 secured to a power switch 28 that is secured to an outer side wall 26 of the enclosure 12. To prevent the existing float switch attached to the installed sump pump 18 from interfering with the operation of the device 10, the existing float switch is removed, bypassed or locked in a closed position, such that the contacts 35 in the level controller 32 are wired in series with the existing closed contacts of the existing pump 18, resulting in only the contacts 35 controlling the operation of the sump pump 18 as described above.

When using the device 10 to remove water from a flooded basement that has lost power to operate an existing sump pump 18 or to remove water from a flooded area that has no existing sump pump, the upper portion 56 of the enclosure 12 is elevated (if necessary) to position the upper portion 56 above an existing water level. A second or 12 V.D.C. sump pump 52 is attached to an inner bottom wall forming a lower portion 58 of the enclosure 12, such that an intake port (not depicted) of the sump pump 52 is positioned to remove a maximum amount of water from a flooded area. The second sump pump 52 is energized by positioning a double pole-single throw switch 51 in a closed position. A flexible conduit 53 having a predetermined length is attached to a discharge port (not depicted) of the sump pump 52, the predetermined length of the conduit 53 enabling the transport of water from a flooded area to an area sufficiently remote to the flooded area to prevent removed water from seeping back into the flooded area. Power cord 72 is independently "wound-up" and secured to the carrying handle 14, wires 33 and level sensor 30 are disconnected from the level controller 32, and power cord 27 is disconnected and disposed adjacent to the sump pump, thereby preventing the cords, plugs and wires from being damaged when the device is being operated to remove water from the flooded area.

In the event that the device 10 is being used as a back-up power supply for a basement sump pump 18 that has had a main power source interrupted, and rising water in the sump well 20 is faster than sump pump 18 can remove, upon an accumulation of water in the basement, the sump pump 52 in the enclosure 12 of the device 10 can be energized by manually closing the starting switch 51, thereby increasing the pumping capacity for removing water from the sump well 20, and lowering the water collecting in the basement. To prevent the sump pump 52 from being damaged when water level in the basement is reduced such that no water or very little water is circulating through the sump pump 52, a low water level shutdown switch can be included in the lower portion 58 of the enclosure 12 to de-energize the sump pump 52. Furthermore, a relay can be installed in place of the starting switch 51 to enable a person to remotely energize or de-energize the sump pump 52 by "instructing" the level controller 32 by a smart phone to energize or de-energize the relay, thereby correspondingly closing or opening contacts in the electrical circuit providing power to the sump pump 52, resulting in the starting or stopping of the sump pump 52.

The foregoing description is for the purpose of illustration only and is not intended to limit the scope of protection accorded this invention. The scope of protection is to be measured by the following claims, which should be interpreted as broadly as the inventive contribution permits.

The invention claimed is:

1. A mobile-automatic power supply device comprising:
an enclosure having a handle and wheels attached to said enclosure for moving said device, said enclosure having slidably connected upper and lower portions that enable an upper portion of said enclosure to be elevated above a water-level and detachably secured to said lower portion, thereby isolating electrical components in said upper portion from said lower portion, said lower portion having an open wall for access to a D.C. sump pump disposed in said lower portion;
a battery sized to operate a remote sump pump in a sump pump well and said D.C. sump pump disposed in said lower portion of said enclosure for a predetermined time period;
an electrical switch for connecting said D.C. sump pump to said battery;
an electrical receptacle for receiving a power cord connected to the remote sump pump;
an electrical inverter for converting 12 V.D.C. to 120 V.A.C. for energizing the remote sump pump in the sump pump well;
a level controller disposed in said enclosure; and
a level sensor disposed in the sump pump well, said level controller being electrically connected to said level sensor, said level sensor providing said level controller an input signal corresponding to a level in the sump pump well, said level controller energizing the remote sump pump when a predetermined high water level in the sump pump well is indicated by said level sensor, said level controller de-energizing the remote sump pump when a predetermined low water level in the sump pump well is indicated; whereby, said device is disposed to electrically receive the power cord connected to the remote sump pump and to automatically energize and de-energize the remote-sump pump for removing water from the sump pump well; and said D.C. pump in said lower portion of said enclosure energized and de-energized via said electrical switch connected to said D.C. pump to remove water inside said lower portion of said enclosure.

2. The device of claim 1 wherein said enclosure includes a lifting handle for manually carrying said enclosure.

3. The device of claim 1 wherein said enclosure includes a second battery electrically connected in parallel with said battery for energizing the remote sump pump in the sump pump well.

4. The device of claim 1 wherein said enclosure includes an electrical receptacle and voltage regulator for receiving power from a solar panel for charging said battery irrespective of a power outage occurring.

5. The device of claim 1 wherein said enclosure includes a battery charger member disposed in said enclosure, said battery charger maintaining said battery at full charge during time periods when there is no power outage.

6. The device of claim 1 wherein said level sensor includes a high water level alarm set-point for a predetermined communication system that announces a high water condition is present in the sump well.

7. The device of claim 6 wherein said predetermined communication system includes an audio signal, a visual signal, an internet message, a phone call and combinations thereof.

8. The device of claim 1 wherein said level sensor includes an electrical float switch, a sonic sensor, and a sensing rod inserted into the sump pump well.

9. The device of claim 1 wherein said enclosure includes castors secured to the bottom surface of said enclosure for promoting manual movement of the device upon a substantially horizontal surface, thereby enabling manual movement of said device to dispose said device proximate to the sump well.

10. The device of claim 6 wherein said enclosure includes WIFI modules to enable information pertaining to water level in the sump well to be transmitted via the internet to a predetermined email address.

11. The device of claim 1 wherein said enclosure includes a second battery electrically connected in parallel with said battery for energizing said D.C. pump.

12. The device of claim 1 wherein said enclosure includes at least one telescoping leg that locks at a selected expansion dimension for elevating said upper portion of said enclosure.

13. A power supply device for removing water from a predetermined area comprising:
an enclosure having slidably connected upper and lower portions that enable an upper portion of said enclosure to be elevated above a water level and detachably secured to said lower portion, thereby isolating electrical components in said upper portion from said lower portion;
a battery sized to operate a remote sump pump in a sump pump well for a predetermined time period after a power outage;
an electrical receptacle for receiving a power cord connected to the remote sump pump;
a level controller disposed in said upper portion of said enclosure; and
a level sensor disposed in the sump pump well, said level controller being electrically connected to said level sensor, said level sensor providing said level controller an input signal corresponding to a level in the sump pump well, said level controller energizing the remote sump pump when a predetermined high water level in the sump well is indicated by said level sensor, said level controller de-energizing the remote sump pump when a predetermined low water level in the sump pump well is indicated; whereby, said device electrically receives the power cord connected to the remote sump pump and automatically energizes and de-energizes the remote sump pump for removing water from the sump pump well.

14. The device of claim 13 wherein said enclosure includes a battery charger member, said battery charger maintaining said battery at full charge during time periods when there is no power outage.

15. The device of claim 13 wherein said enclosure includes an electrical inverter for converting 12 V.D.C. to an A.C. voltage required to energize a remote sump pump.

\* \* \* \* \*